(12) United States Patent
Sandberg et al.

(10) Patent No.: US 10,391,946 B2
(45) Date of Patent: Aug. 27, 2019

(54) ROOF RACK KIT AND A LOAD STRIP FOR A LOAD CARRYING BAR

(71) Applicant: Thule Sweden AB, Hillerstorp (SE)

(72) Inventors: Mikael Sandberg, Halmstad (SE); Wilhelm Larsson, Värnamo (SE); Tobias Rydholm, Tenhult (SE)

(73) Assignee: Thule Sweden AB, Hillerstorp (SE)

( * ) Notice: Subject to any disclaimer, the term of this patent is extended or adjusted under 35 U.S.C. 154(b) by 755 days.

(21) Appl. No.: 14/957,365

(22) Filed: Dec. 2, 2015

(65) Prior Publication Data
US 2016/0167590 A1    Jun. 16, 2016

(30) Foreign Application Priority Data
Dec. 12, 2014   (EP) .................................. 14197705

(51) Int. Cl.
| | |
|---|---|
| *B60R 9/042* | (2006.01) |
| *B60R 9/04* | (2006.01) |
| *B60R 9/045* | (2006.01) |
| *B60R 9/052* | (2006.01) |

(52) U.S. Cl.
CPC .............. *B60R 9/042* (2013.01); *B60R 9/045* (2013.01); *B60R 9/052* (2013.01)

(58) Field of Classification Search
CPC ............ B60R 9/042; B60R 9/04; B60R 9/045
USPC ....................................... 224/310, 321, 327
See application file for complete search history.

(56) References Cited

U.S. PATENT DOCUMENTS

| | | | | |
|---|---|---|---|---|
| 2,230,688 A | * | 2/1941 | Irwin .................... | E01C 11/106 16/7 |
| 3,213,584 A | * | 10/1965 | Bush ........................ | E04B 1/68 277/641 |
| 3,606,432 A | * | 9/1971 | Honatzis ................. | B60R 13/04 293/128 |
| 4,015,760 A | * | 4/1977 | Bott ......................... | B60R 9/04 224/324 |

(Continued)

FOREIGN PATENT DOCUMENTS

| | | |
|---|---|---|
| DE | 10 2008 05282 | 4/2010 |
| WO | WO 2009/082769 | 7/2009 |
| WO | WO 2014/185019 | 11/2014 |

OTHER PUBLICATIONS

European Search Report for European Application No. EP 14197705.8, European Patent Office, Munich, Germany, dated May 29, 2015, 6 pages.

*Primary Examiner* — Nathan J Newhouse
*Assistant Examiner* — Lester L Vanterpool
(74) *Attorney, Agent, or Firm* — Sterne, Kessler, Goldstein & Fox P.L.L.C.

(57) ABSTRACT

A roof rack kit includes at least a first and a second load carrying bar attachable to a vehicle and adapted to extend across the roof of the vehicle. The roof rack kit further includes a first load strip with a first height protruding vertically from the outer periphery of the first load carrying bar and a second load strip having a second height protruding vertically from the outer periphery of the second load carrying bar. The first height of the first load strip is different from the second height of the second load strip, so as to compensate for a height difference between the first and the second load carrying bar when the first and the second load carrying bars are mounted on the vehicle.

19 Claims, 5 Drawing Sheets

(56) References Cited

U.S. PATENT DOCUMENTS

| | | | | |
|---|---|---|---|---|
| 4,067,155 A * | 1/1978 | Ruff | ............. | E04B 1/6803 4/498 |
| 4,432,478 A * | 2/1984 | Bott | ............. | B60R 9/04 224/321 |
| 5,096,106 A * | 3/1992 | Foster | ............. | B60R 9/045 16/349 |
| 5,207,365 A * | 5/1993 | Bott | ............. | B60R 9/00 224/316 |
| 5,282,560 A * | 2/1994 | Ozog | ............. | B60R 9/05 224/316 |
| 5,456,396 A | 10/1995 | Allen | | |
| 5,474,218 A * | 12/1995 | Arsenault, Jr. | ............. | B60R 9/05 224/309 |
| 5,511,708 A * | 4/1996 | Cronce | ............. | B60R 9/045 224/321 |
| 5,531,455 A * | 7/1996 | Calixto | ............. | E02D 29/16 277/637 |
| 5,888,017 A * | 3/1999 | Corrie | ............. | E01C 11/106 404/64 |
| 6,029,873 A * | 2/2000 | Won | ............. | B60R 9/04 224/309 |
| 6,219,982 B1 * | 4/2001 | Eyring | ............. | E04B 1/6803 52/393 |
| 6,276,747 B1 * | 8/2001 | Ogawa | ............. | B60R 9/05 224/316 |
| 6,769,728 B2 * | 8/2004 | Albaisa | ............. | B60R 9/04 224/309 |
| 7,422,130 B2 * | 9/2008 | Shaukat | ............. | B60R 9/045 224/309 |
| 8,167,179 B2 * | 5/2012 | Thomas | ............. | B60R 9/045 224/315 |
| 8,544,707 B2 * | 10/2013 | Hubbard | ............. | B60R 9/04 224/309 |
| 8,678,256 B2 * | 3/2014 | Polewarczyk | ............. | B60R 9/045 224/321 |
| 9,150,159 B1 * | 10/2015 | Meszaros | ............. | B60R 9/045 |
| 2004/0195866 A1 * | 10/2004 | Fin | ............. | B60R 9/045 296/210 |
| 2007/0039985 A1 * | 2/2007 | Warren | ............. | B60R 9/04 224/321 |
| 2007/0075108 A1 * | 4/2007 | Stapleton | ............. | B60R 9/045 224/321 |
| 2008/0272624 A1 * | 11/2008 | Donicke | ............. | B60R 9/045 296/216.01 |
| 2008/0290123 A1 * | 11/2008 | Sprague | ............. | B60R 9/045 224/321 |

* cited by examiner

ROOF RACK KIT AND A LOAD STRIP FOR A LOAD CARRYING BAR

FIELD

The present invention relates to a roof rack kit and a load strip for a roof rack kit. The load strip is adapted to adjust for a height difference between the load carrying surfaces of at least two load carrying bars.

BACKGROUND

Roof rack kits comprising load carrying bars mounted to the roof of an automobile via load carrier feet are commonly used to provide for an improved load capacity on automobiles.

During recent years, a trend has been that the cross section of the load carrying bars has been improved to reduce wind resistance and noise. One type of improved load carrying bars has a wing like cross section providing relatively low wind resistance and low noise level.

To attach load carrying bar accessories, such as a roof box, to a load carrying bar having a wing like cross section, the load carrying bar is generally equipped with a slot, sometimes referred to as a channel. The slot extends along the length of the load carrying bar and permits a fastening member to be slid along the slot and into position. The fastening member can be a nut and a screw for example. Such slots are however associated with numerous problems such as wind turbulence increasing the wind noise and wind resistance. They can also collect dirt or rubble, which in turn accidentally could damage the lacquer of the automobile or complicate the attachment of a load carrying bar accessory.

One problem with a roof rack kit arranged on the roof of a vehicle can be that the load carrying bars are not horizontally aligned, i.e. there is a height difference between the load receiving surfaces of the load carrying bars. This problem may arise when a load should rest on two load carrying bars. In such a case the load may not be fully horizontal if one load carrying bar is positioned at a slightly different height. However the problem becomes more prominent when the roof rack kit has more than two load carrying bars. One such delicate situation is when a load should rest on three or more load carrying bars. If the load is heavy it is important to distribute the weight of the load on all of the load carrying bars. It is also important that the load is tightly secured to the roof of the vehicle during transportation with straps for example. If there is a play between the load and one or more of the load carrying bars, the load dependent on its nature could be displaced slightly during transportation and the mentioned play could come into action so that the load is temporarily or permanently less secured. Such play between the load and a load carrying bar could also permit the load to oscillate and over time damage the straps, the load, or the load carrying bars through wear and/or fatigue.

There is thus a need to align or adjust the load carrying surface of the load carrying bars of a roof rack kit.

BRIEF SUMMARY

It is an objective of the present invention to remove or at least reduce the above mentioned drawbacks. The objective is at least partly met by a roof rack kit comprising at least a first and a second load carrying bar attachable to the a vehicle and adapted to extend across the roof of the vehicle. A first load strip having a first height protrudes vertically from the outer periphery of the first load carrying bar and a second load strip having a second height protrudes vertically from the outer periphery of the second load carrying bar. The first height of the first load strip is different, preferably higher, than the second height of the load strip so as to compensate for a height difference between the first and the second load carrying bar when the first and the second load carrying bar are mounted on the vehicle.

The roof rack kit provide a roof rack kit which height can be adjusted permitting the load carrying surfaces of the load carrying bars of the roof rack kit to be aligned or adjusted slightly to a desired height. It permits the height to be reduced or increased dependent on the height difference between the individual load carrying surfaces of the load carrying bars. It is also a simple and cheap way of providing a height adjustment function as the load carrying bars, or other parts of the roof rack kit, requires little or no manipulation.

At least the first load strip can be detachably connected to the first load carrying bar.

The load carrying bars of the roof rack kit can be of different types or of the same type. One type of load carrying bar is the type having a slot with an upwardly facing opening. Such slot can be used to attach a load carrying bar accessory such as an attachment member for a roof box for example. At least one of the load carrying bars of the roof rack kit can comprise a slot with an upwardly facing opening wherein the load strip is adapted to be at least partly positioned in the slot. The first and the second load carrying bar can each comprise a slot having an upwardly facing opening. The slots extend along the length of the first and the second load carrying bars. The first and the second load strips can be adapted to be at least partly positioned in the first and second slot respectively. It is of course possible that the first and the second load strips can be adapted to be positioned adjacent, or in the proximity of, the slot. The void of slot would then be unobstructed and free to use with a load carrying bar accessory.

Having a load strip arranged in the slot of a load carrying bar generally provides a noise reducing feature. In this case it also provides the capability of adjusting the height between at least two load carrying bars, and the load carrying surfaces to be more specific. It further provides a good attachment for the load strip to the load carrying bar which is generally detachable.

It has been found advantageous if the first height of the first load strip is at least 30% higher than the second height of the second load strip, preferably 30-300% higher, more preferably 30-200% higher. Having a load strip which relative height is at least 30% higher compared to a second load strip provide an appropriate difference. It has been found however that in some cases, a too big difference is less advantageous as the rigidity of the load strip can be reduced as the height grows, hence the difference should not be larger than 300% in some cases.

At least one of the first or the second load strips, preferably both, can have a solid cross section, preferably all along the length of the load strip. A solid cross section of the load strip provide increased stiffness in some cases, it also enable a simple manufacturing procedure e.g. through extrusion.

The first and the second load strip can have an upper portion and a lower portion, e.g. separated by a waist portion. The lower portion of the load strip can be adapted to be positioned in the slot of the load carrying bar if such is present. The cross section of the lower portions of the first and the second load strips can be at least similar, or identical. The upper portions of the first and the second load strips can also be similar but generally having different proportions, i.e. the same shape but of different size. Having load strips having similar, or identical lower portions, but different upper portions enable the load strips to be interchangeably with each other and with respect to the first and the second load carrying bar, or the third load carrying bar if such is present. This provides a roof rack kit which is user friendly. The first and the second load carrying bar have a first and a second cross section respectively cross sections can be identical.

The roof rack kit can comprise at least one more load strip. In practice this lets a user select which load strip that is appropriate to use with one of the load carrying bars. The at least one more load strip can have a third height which is different from the first and the second height. Hence, it has been found advantageous that a roof rack kit comprises at least one more load strip than the number of load carrying bars. This permits a user to select the most appropriate load strip based on the desired height which needs to be adjusted.

The roof rack kit can comprise two or more load carrying bars, three or more load carrying bars, four or more load carrying bars. The roof rack kit can comprise at least one more load carrying bar attachable to the vehicle and adapted to extend across the roof of the vehicle. In cases of at least one more load carrying bar, a third load carrying bar, such load carrying bar preferably comprises a slot, i.e. a third slot, extending along the length of the third load carrying bar. The at least one more load carrying bar can thus be of similar or identical type as the first and the second load carrying bar, but it could also be of a different type.

The first load strip can have an upper portion and a lower portion. The lower portion of the first load strip can be adapted to be positioned in the first slot of the first load carrying bar and the lower portion of the first load strip can be adapted to brace against the floor of the first slot of the first load carrying bar. If the load strip braces against the floor of the slot of the load carrying bar, it can build in height yet still carry a heavy load without bending or caving in.

The lower portion of the first load strip can have a convex or conical surface adapted to be positioned adjacent the floor of the first slot of the first load carrying bar. This will reduce the friction between the floor of the slot and the load strip. A low friction between the slot and the especially the floor of the slot and the load strip make mounting of the load strip easy as a load strip can be generally inserted at the end of a load carrying bar and pulled through the slot to its final position. The convex or conical surface of the lower portion of the first load strip can be said to have an apex, which apex is preferably substantially aligned with the center of the opening of the first slot of the first load carrying bar after assembly therewith.

It should be noted that the load strip, and features relating to the load strip, may be described herein in combination with a roof rack kit, but it is within the boundaries of the present invention that the load strip can be a complete separate entity with respect to a roof rack kit and a load carrying bar, even if described in the context of a roof rack kit or a load carrying bar.

The load strip described herein can be a load strip adapted to be attached a load carrying bar of a roof rack and adapted to protrude in a vertical direction from the outer periphery of the load carrying bar after being attached thereto. The load strip protrudes a distance of 3-40 mm in the vertical direction. The load strip form an elevated load receiving surface, i.e. an elevated load carrying surface, and provide a user with the possibility to adjust for a difference in height between at least two load carrying surfaces of at least two load carrying bars, preferably to align the load carrying surfaces of the load carrying bars.

The load strip can have a lower portion and an upper portion, wherein the lower portion is adapted to be inserted into a slot of the load carrying bar. If it is desirable with a load strip which can be used to adjust the height of a load carrying bar but not be too big, the upper portion can protrude 3-40 mm in the vertical direction, or 3-30 mm, preferably 3-25 mm, more preferably 4-25 mm, even more preferably 5-25 mm, optionally 10-25 mm.

The upper portion and the lower portion can be separated by a waist portion. The waist portion can have a cross section which is smaller than the cross section of the lower portion and the upper portion. This enable the load strip to be fastened to an opening of the slot for example.

The load strip can be made of rubber, or rubber like materials, plastic materials, thermoplastic materials or mixtures thereof. A suitable material for the load strip should be a material which can withstand the high weight imparted by a load mounted on a roof rack kit while at the same time withstand the shear imparted by the inertia of the same load when the vehicle accelerates or brakes. The load strip may also be manufactured from two or more materials which has been attached or combined together so as to form one unit, e.g. by adhesive, vulcanization, soldering, form molding, or molding for example. The two or more different materials can be selected so as to impose different characteristic to the load strip such as increased friction, light weight, rigid properties or the like.

It is thus disclosed herein a load strip adapted to be attached to a load carrying bar of a roof rack kit, the load strip comprising two or more different materials, the two or more different materials are preferably distinctively different, i.e. not a blend of materials. The two or more different materials can be attached together by adhesive, vulcanization, soldering and/or molding. The load strip can be configured to, i.e. adapted to, protrude 3-40 mm in a vertical direction from the outer periphery of a load carrying bar after being attached thereto.

The load strip can be modular in terms of that at least two material strips can be attached or removed from each other to form a load strip which can be used to adjust the relative height between the load carrying surfaces of a load carrying bar. The load strip can comprise a first and a second material strip. The second material strip can be removed or attached to the first material strip in order to adjust the height of the load strip. In a preferred embodiment, the second material strip can be removed from the first material strip to reduce the height of the load strip.

The load strip can as mentioned above have an upper and a lower portion separated by a waist portion. The upper and lower could both serve as a load receiving surface and have different heights, thus permitting a user to turn the load strip, i.e. rotate it 180 degrees along the length (the Z-axis). This would enable a user to adjust the height to two different heights using one load strip.

According to an aspect, the invention also relates to a method for adjusting the height between a first and a second load carrying bar. The method comprises the steps of:

providing a first and a second load carrying bar;

adjusting a difference in height between said first and said second load carrying bar by providing a first load carrying bar with a first load strip having a first height protruding from the outer periphery of the first load carrying bar and;

providing a second load carrying bar with a second load strip having a second height protruding from the outer periphery of the second load carrying bar whereby;

said first height of said first load strip is different from said second height of said second load strip, preferably higher.

BRIEF DESCRIPTION OF THE DRAWINGS

Non-limiting embodiment according to the present invention will be described with reference to the accompanying drawings in which.

DETAILED DESCRIPTION

Figure 1:
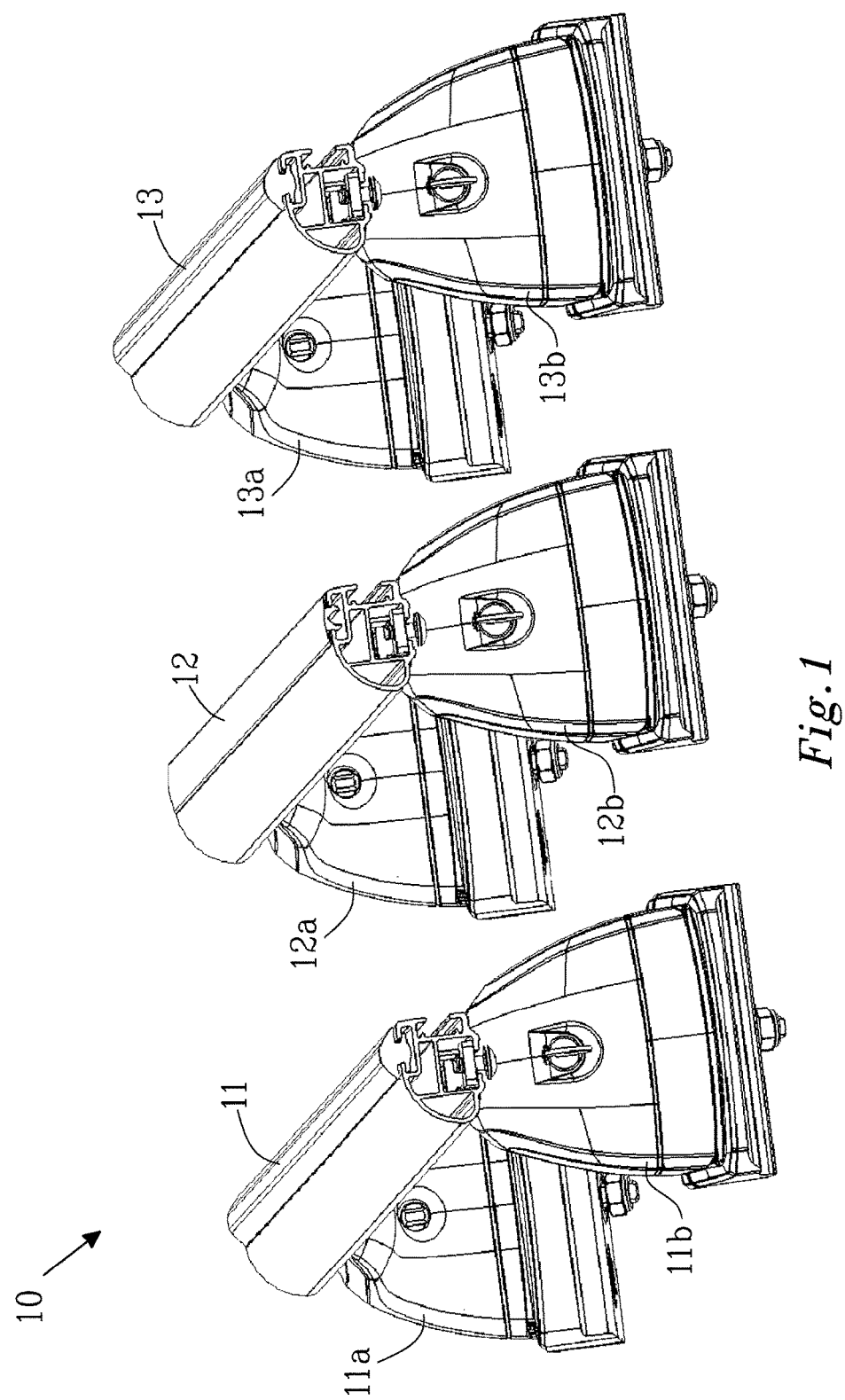
FIG. 1 shows three load carrying bars each comprising a load strip wherein two of the load strips are provided with an increased height to compensate for a relative height difference between the load carrying bars.
Figure 2:
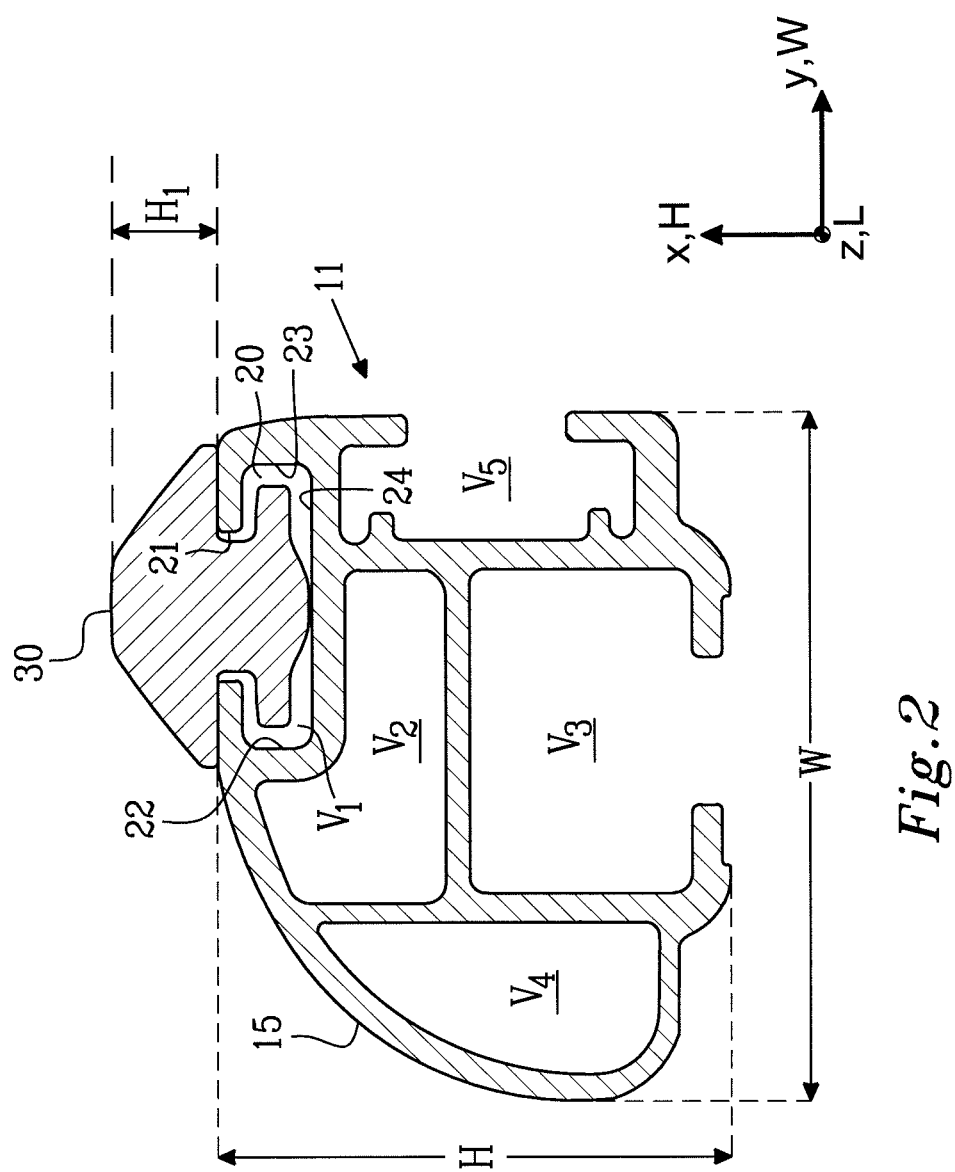
FIG. 2 shows the cross section of the first load carrying bar and the load strip shown in FIG. 1.

FIG. 1 shows a roof rack kit 10 comprising three load carrying bars 11, 12, 13. The roof rack kit 10 is intended during use to be mounted to the roof of a vehicle, such as an automobile such as a car or truck. A first and a second load carrier foot 11a, 11b, 12a, 12b, 13a, 13b are generally positioned on each side of the automobile to retain the load carrying bras to the roof of the vehicle and so that each load carrying bar 11, 12, 13 extend transversely across the roof of the automobile. The load carrying bars 11, 12, 13 are formed by extruded material such as aluminum and has a substantially oval cross section as can be seen in FIG. 1 and FIG. 2 for example with openings at each end (only one end is shown in FIG. 1). The ends of the load carrying bars 11, 12, 13 can be sealed if desired by a separate lid, plug or by parts of the load carrier foot for example.

FIG. 2 shows the load carrying bar 11 with a view towards the side. Although only one load carrying bar is described below, the features are applicable on all the load carrying bars of the roof rack kit described herein, or on one or more thereof such as at least two of the load carrying bars of the roof rack kit, or on all of the load carrying bars of the roof rack kit. The load carrying bar 11 comprises a channel 20 for receiving a fastening member for a load carrying accessory. A load carrying accessory can be a roof box, a bicycle carrier, a luggage carrier, a ski carrier, or any other load carrier suitable to mount on a roof rack. The fastening member is generally the member which is used to attached the load carrier accessory to the load carrying bar 11 and can be a screw and a slideable nut for example.

For the purpose of orientation, the load carrying bar 11 as described herein, has a length L usually extending along the width of the vehicle, a height H usually extending along the height of the vehicle and corresponding to a vertical direction, and a width W usually extending along the length of the vehicle and corresponding to a horizontal direction, when the load carrying bar 11 is mounted in the intended way to the vehicle.

A slot 20 extends along the full length of the load carrying bar 11 and is defined by an opening 21, a first and a second side wall 22, 23 and a floor 24. The first and the second side wall 22, 23 and the floor 24 of the slot 20 forms parts of a frame work structure of the load carrying bar 11 which significantly enhances the rigidity of the load carrying bar 12. The load carrying bar 11 thus can be provided with a frame work structure formed by walls partitioning the inside of the load carrying bar into a number of sub-voids V1, V2, V3, V4, V5. The load carrying bar 11 further has an outer periphery 15.

A load strip 30 is arranged in the slot 20. The slot infill 31 substantially seal the opening 21 of the channel 20 and reduces the air turbulence which otherwise can be formed from the opening 21 and the slot 20. The slot infill 31 also prevents the intrusion of dirt or rubble into the slot 20 which could obstruct the free passage of a fastening member for a load carrier accessory and thereby make the fastening member slide less easy in the slot 20.

A load strip is a material strip which is attached, releasably or permanently, to the load carrying bar to provide a forgiving and more lenient load carrying surface to the load carrying bar as compared to the material the load carrying bar itself is made from.

Figure 4:
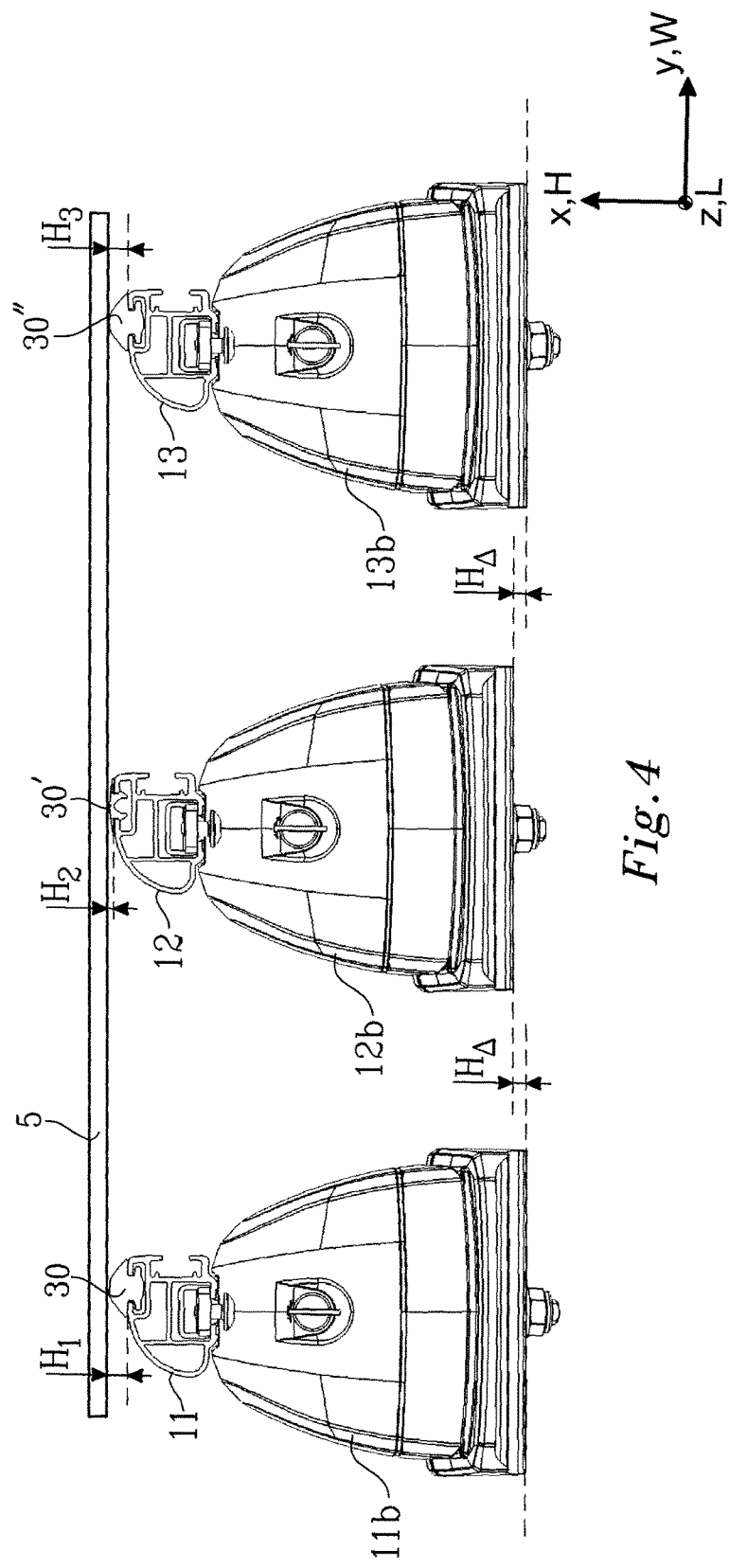
FIG. 4 shows the three load carrying bars and load strips of FIG. 1 with a view from the side, wherein a load is arranged onto the load carrying bar.

The load strip 30 builds height in the vertical direction from the periphery 15 of the load carrying bar 11. The height which the load strip 30 extends from the periphery 15 of the load carrying bar 11 is indicated in FIG. 2 by H1. Hence the height that a load strips extends from the outer periphery of a load carrying bar should be measured as indicated in FIG. 2. If the slot of the load carrying bar, and the opening of the slot of the load carrying bar has an opening which has a difference in height as seen along the width of the load carrying bar, the height of the load strip extending from the periphery of a load carrying bar should be measured from the highest point on the outer periphery of the load carrying bar when viewed as shown in FIG. 2. The outer periphery of the load carrying bar can thus be defined as the load receiving surface of the load carrying bar before the load carrying bar is provided with the load strip. In cases of difficulties in finding the load receiving surface before the load carrying bar is provided with the load strip, the load receiving surface of the load carrying bar can be defined by placing a rigid load, such as a wooden board, on two load carrying bars, substantially as shown in FIG. 4.

The height by which the load strip protrudes from the outer periphery can be used to better position a load arranged on the roof rack kit. By adjusting the height of the load strip, i.e. by select an appropriate load strip having an appropriate height, the load on the roof rack kit can be levelled or adjusted with respect to a horizontal plane. But even more importantly, the adjusted height substantially removes, or at least reduces, the play between the load and the load carrying surfaces of the load carrying bars 11, 12, 13. Removing or at least reducing such play will effectively reduce the risk of the load, or the arrangement by which the load is attached to the load carrying bars i.e. the roof rack kit, from being accidentally damaged or deteriorated.

Figure 3:
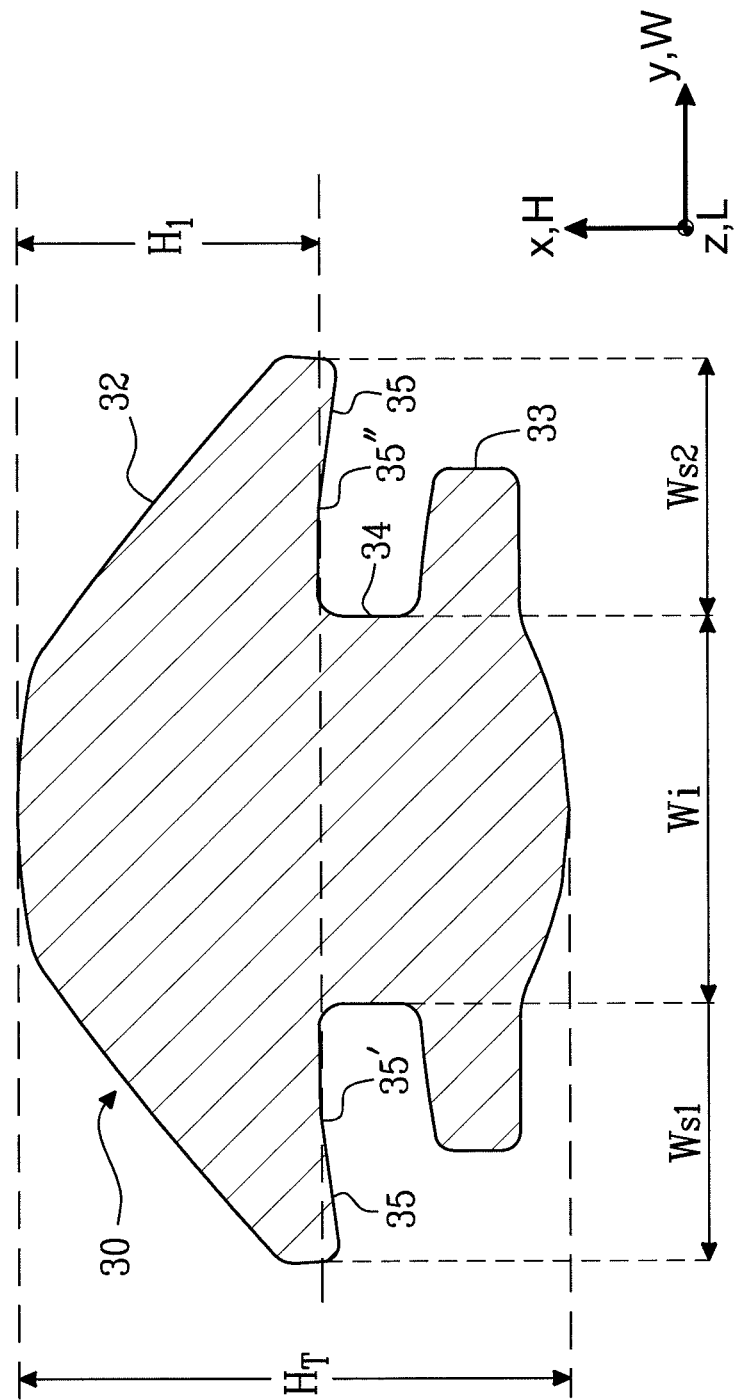
FIG. 3 shows the cross section of the load strip of FIG. 2 in greater detail.

A suitable load strip which can be used with a load carrying bar of a roof rack kit will be described in greater detail with reference to FIG. 3. FIG. 3 shows the cross section of the load strip 30. The load strip shown in FIG. 3 is specifically configured to be positioned in a slot of a load carrying bar, as shown in FIGS. 1 and 2 for example, and protrude from the opening of the slot in a vertical and upwardly direction. As is understandable when studying the description herein, a load strip does not necessarily need to be positioned in a slot of a load carrying bar to be retained to the load carrying bar but can be retained by other means, such as by adhesive, snap-on connections, or other mechanical connections. Other forms of the cross section are of course possible, the cross section can be non-symmetrical for example.

FIG. 3 shows the load strip 30 with a view along the length L of the load strip 30. The load strip 30 has an upper portion 32 and a lower portion 33 and an intermediate waist portion 34. The upper portion 32 has a width which is larger than both the lower portion 33 and the intermediate waist portion 34, so that the load strip 30 has a substantially mushroom shaped cross section. The intermediate waist portion 34 preferably has a width which is slightly smaller than the width of the opening of the slot.

The height H1 by which the load strip 30 protrudes from the outer periphery of the load carrying bar 11 can be 3-40 mm in said vertical direction, optionally 3-30 mm, preferably 3-25 mm, more preferably 4-25 mm, even more preferably 5-25 mm or 10-25 mm. It has been found advantageous that the protruding height H1 and the total height Ht follows the relationship H1/Ht≤0.2-0.86 as it permits the load strip to be sufficiently mechanically anchored to the load carrying bar.

TABLE 1 protruding heights H1 and total heights Ht relationships for different load strips when measured as indicated in FIG. 3.

| H1 (mm) | Ht (mm) | H1/Ht (approximated value) |
| --- | --- | --- |
| 3 | 13 | 0.23 |
| 5 | 13 | 0.38 |
| 8 | 13 | 0.62 |
| 5 | 25 | 0.2 |
| 10 | 25 | 0.4 |
| 15 | 25 | 0.6 |
| 15 | 30 | 0.5 |
| 20 | 30 | 0.67 |
| 25 | 30 | 0.83 |
| 30 | 35 | 0.86 |

Table 1 discloses the protruding height H1 and the total height Ht relationships for different load strips when measured as indicated in FIG. 3.

The load strip should be rigid enough support a downwardly directed force due to gravity from the load and not yield to the shearing force imparted from the inertia of the load when a vehicle is retarding for example. If the load strip builds in height H1, it may be advantageous that the load strip also builds in width.

The upper portion 32 of the load strip 30 has a support surface 35 which is adapted to rest against the outer periphery of the load carrying bar when mounted thereto. The support surface 35 is divided in FIG. 3 by the intermediate waist portion 34 into a first and a second support surface 35', 35" when viewed as shown in FIG. 3. The first and the second support surface 35', 35" has a width Ws1 and Ws2 respectively and the intermediate waist portion 34 has a width Wi. It has been found that a favorable width/height relationship between the width of the first and the second support surfaces Ws1, Ws2 and the height H1 of the upper portion 32 can be expressed as (Ws1+Ws2)/H1 should be in the interval from 0.8-1.2.

FIG. 4 shows different cross sections of different load strips when viewed along the length L which can be used to adjust for height differences between load carrying bars of a roof rack kit after being mounted to a vehicle.

FIG. 4 shows the roof rack kit of FIG. 1 but with a view along the length L of the load carrying bars 11, 12, 13. It should be noted that only one load carrier foot is shown in FIG. 4 of the pair of load carrier feet of each load carrying bar. A load 5 is positioned on top of the load carrying bars 11, 12, 13. As is noticed, the load carrying feet 11b, 12b, 13b are positioned during use on the vehicle roof. As vehicle roofs tend to have a degree of curvature along the length of the vehicle, the load carrier feet may be positioned on different relative heights after being mounted to the vehicle roof. The just mentioned difference in height has been indicated in FIG. 4 by the reference HΔ. As is noticeable, as the load carrier feet are positioned at different relative height, the upper surface of the load carrying bars 11, 12, 13 will also be positioned at different heights, if the load carrier feet themselves are not adapted to compensate for such misalignment. Such difference in height will of course be materialized in that the load 5 may be not levelled with respect to the load carrying bars 11, 12, 13.

The difference in height can always be related to a horizontal reference line, in this case represented by the dotted line in FIG. 4 following the underside of the load 5.

As is shown in FIG. 4 such drawbacks can easily be averted by having load strips having different heights protruding from the periphery of the load carrying bars. In FIG. 4, the first load carrying bar 11 comprises a first load strip 30 having a first height H1, the second load carrying bar 12 has a second load strip 30' having a second height H2. The first height H1 of the first load strip 30 is larger than the second height H2 of the second load strip 30'. Having load strip of different heights compensate for the difference emerged by the different positions of the load carrier feet 11b, 12b, 13b. As a consequence, a user can compensate for a relative height difference between the upper surfaces of the load carrying bars, i.e. the surfaces intended to be positioned adjacent the load.

In the shown embodiment of FIG. 4 the third load carrying bar 13 comprises a third load strip 30" having a third height H3 which is equal to the first height H1 of the first load strip 30 of the first load carrying bar 11. The roof rack kit, and the load carrying bars, can thus be provided with load strips of different heights such as at least two different heights.

The load strip 30 can be specifically configured to provide an increased friction between a load arranged on the load carrying bar 11 and the load carrying bar 11 itself. Such increased friction could be provided by treating the load facing surface of the load strip 30 with a friction enhancing material. The friction enhancing material could be provided by coating, adhering, molding or the like.

As is understood, the load strip can be manufactured in one unitary piece of material, or by two or more materials. For example, the load strip can be molded by two or more materials having different properties such as different frictions, different stiffness. A load strip can be formed by having a stiff core and a material having a relatively high friction enveloping the stiff core for example.

Figure 5:
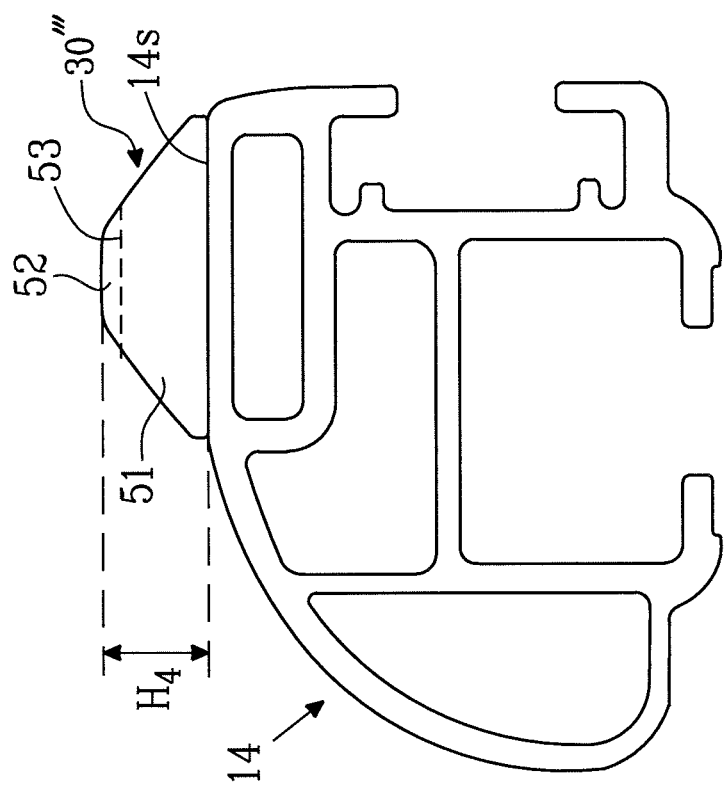
FIG. 5 shows a second embodiment of a load strip.

FIG. 5 shows a load carrying bar 14 comprising a load strip 30''' having a slightly different cross section. The load strip 30''' is positioned onto the outer surface 14s of the load carrying bar 14, i.e. on to that surface which is intended to face the load during use. The load strip 30''' has a height H4, i.e. a fourth height, by which the load strip protrudes from the outer periphery of the load carrying bar 14. The fourth height H4 can be equal or different to the heights H1, H2, H3 of the load strips 30, 30', 30" described with reference to FIG. 4. The shown load strip 30''' is adapted to be adhered using an adhesive, such as with a hot-melt adhesive or a bi-component adhesive, to the surface of the load carrying bar 14. The load strip is as shown homogenous throughout the load strip. The load strip could however be hollow e.g. surrounded by a stiff material. It can be porous, or having alternating homogenous and hollow sections for example.

The load strip can thus be attached to the load carrying bar in different manners. The load strip can be adapted to be positioned and retained by assistance of a slot on the load carrying bar, it can be adhered onto a surface of the load carrying bar by e.g. adhesive or by applying heat and melt a portion of the load strip, or it can be provided with specific attachment members which are adapted to be mated with corresponding members on the load carrying bar.

The load strip can be made of rubber, or rubber like materials, plastic materials, thermoplastic materials or mixtures thereof. The load strips are preferably formed by molding, form molding, press casting (die casting) or extrusion.

The load strip may comprise a first and a second material strip 51, 52, wherein the second material strip 52 can be removed from the first material strip 51 in order to reduce the height of said load strip 30'''. In FIG. 5 the separation is indicated by the dotted line 50. The second material strip 52 can be adhered to the first material strip 51 by adhesive, or the separation line can be formed by perforations in the load strip 30''' permitting a user to tear off the second strip 52 from the first strip 51 to reduce the height H4 of the load strip to an appropriate height.

What is claimed is:

1. A roof rack kit, comprising:
   at least a first and a second load carrying bar attachable to a vehicle and configured to extend across the roof of said vehicle;
   a first load strip comprising an upper portion protruding vertically from an outer periphery of said first load carrying bar, said upper portion having a first height; and
   a second load strip comprising an upper portion protruding vertically from an outer periphery of said second load carrying bar, said upper portion having a second height,
   wherein said first height of said upper portion of said first load strip is different from said second height of said upper portion of said second load strip, so as to compensate for a height difference between said first and said second load carrying bars when said first and said second load carrying bars are mounted on said vehicle.

2. The roof rack kit according to claim 1, wherein said first height of said upper portion of said first load strip is higher than said second height of said upper portion of said second load strip, wherein said first height of said upper portion of said first load strip is at least 30% higher than said second height of said upper portion of said second load strip.

3. The roof rack kit according to claim 1, wherein at least one of said first and said second load carrying bars comprises a slot having an upwardly facing opening, said slot extending along a length of said first or said second load carrying bars, and wherein at least one of said first and said second load strips are configured to be at least partly positioned in said slot.

4. The roof rack kit according to claim 1, wherein at least one of said first or said second load strips has a solid cross section.

5. The roof rack kit according to claim 3, wherein said first and said second load strips have a lower portion, said lower portion of said first and said second load strips being configured to be positioned in said slot of said load carrying bar, and wherein a cross section of said lower portions of said first and said second load strips are similar.

6. The roof rack kit according to claim 1, wherein said first and said second load carrying bars have a first and a second cross section, respectively, and wherein said first and said second cross sections of said first and said second load carrying bars are identical.

7. The roof rack kit according to claim 1, wherein said roof rack kit comprises a third load carrying bar attachable to said vehicle and configured to extend across said roof of said vehicle, said third load carrying bar comprising a slot extending along the length of said third load carrying bar.

8. The roof rack kit according to claim 3, wherein said first load strip has a lower portion, wherein said lower portion of said first load strip is configured to be positioned in said first slot of said first load carrying bar and wherein said lower portion of said first load strip is configured to brace against a floor of said first slot of said first load carrying bar.

9. The roof rack kit according to claim 8, wherein said lower portion of said first load strip has a convex or conical surface and is configured to be positioned adjacent said floor of said first slot of said first load carrying bar, wherein said convex or conical surface of said lower portion of said first load strip has an apex, wherein said apex is aligned with the center of the opening of said first slot of said first load carrying bar after assembly therewith.

10. The roof rack kit according to claim 1, wherein said first load strip comprises a unitary piece of material.

11. A load strip configured to be attached to a load carrying bar of a roof rack kit, said load strip comprising:
    a lower portion configured to be inserted into a slot of said load carrying bar; and
    an upper portion having a height above said load carrying bar and continuously protruding from said lower portion in a vertical direction from an outer periphery of said load carrying bar after being attached thereto,
    wherein said upper portion of said load strip protrudes a distance of 3-40 mm in said vertical direction from said outer periphery of said load carrying bar; and
    wherein said load strip comprises a first and a second material strip,
    wherein said second material strip is configured to be removed from said first material strip in order to reduce a height of said load strip.

12. The load strip according to claim 11, wherein said upper portion protrudes 3-25 mm in said vertical direction.

13. The load strip according to claim 12, wherein said upper portion and said lower portion are separated by a waist portion, said waist portion having a cross sectional extension which is smaller than a cross section of said lower portion and said upper portion.

14. The load strip according to claim 11, wherein said load strip is made of rubber, plastic materials, thermoplastic materials, or mixtures thereof.

15. The load strip according to claim 11, wherein said upper portion is coupled to said lower portion by an intermediate portion, said intermediate portion having a cross-sectional width smaller than said lower portion.

16. A roof rack kit, comprising:
    at least a first and a second load carrying bar attachable to a vehicle and configured to extend across the roof of said vehicle;
    a first load strip comprising an upper portion having a first height between an upper surface and a support surface configured to contact an outer periphery of said first load carrying bar, said upper portion protruding vertically from the outer periphery of said first load carrying bar; and
    a second load strip comprising an upper portion having a second height between an upper surface and a support surface configured to contact an outer periphery of said second load carrying bar, said upper portion protruding vertically from the outer periphery of said second load carrying bar, wherein said first height of said upper portion of said first load strip is different from said second height of said upper portion of said second load strip, so as to compensate for a height difference between said first and said second load carrying bars when said first and said second load carrying bars are mounted on said vehicle.

17. The roof rack kit according to claim 16, wherein said first load strip comprises a unitary piece of material.

18. The roof rack kit according to claim 16, wherein said first load strip comprises a lower portion configured to contact an inner surface of a channel of said first load carrying bar.

19. The roof rack kit according to claim 16, wherein a ratio of said first height to a total height of said first load strip is not greater than between 0.2 to 0.86.

* * * * *